United States Patent
Breunig et al.

(10) Patent No.: US 9,702,740 B2
(45) Date of Patent: Jul. 11, 2017

(54) MEASURING INSTRUMENT WITH CONNECTING COUPLING

(71) Applicant: WIKA Alexander Wiegand SE & Co. KG, Klingenberg/Main (DE)

(72) Inventors: Christoph Breunig, Buergstadt (DE); Mirko Di Marco, Kleinwallstadt (DE); Thomas Doerig, Wellbach (DE); Tanja Fersch, Moemlingen (DE)

(73) Assignee: WIKA Alexander Wiegand SE & Co. KG, Klingenberg/Main (DE)

( * ) Notice: Subject to any disclaimer, the term of this patent is extended or adjusted under 35 U.S.C. 154(b) by 0 days.

(21) Appl. No.: 15/089,044

(22) Filed: Apr. 1, 2016

(65) Prior Publication Data

US 2016/0305798 A1    Oct. 20, 2016

(30) Foreign Application Priority Data

Apr. 17, 2015  (DE) .................. 10 2015 004 934

(51) Int. Cl.
*G01K 1/08* (2006.01)
*G01D 11/24* (2006.01)
*G01L 19/00* (2006.01)
*F16L 15/08* (2006.01)

(52) U.S. Cl.
CPC ............ *G01D 11/245* (2013.01); *G01K 1/08* (2013.01); *G01L 19/003* (2013.01); *F16L 15/08* (2013.01)

(58) Field of Classification Search
CPC .............................. G01D 11/24; G01D 11/245
USPC ........................................................ 73/431
See application file for complete search history.

(56) References Cited

U.S. PATENT DOCUMENTS

| 3,100,246 | A | * | 8/1963 | Riley | ................. | H01T 1/14 337/30 |
| 3,791,397 | A | * | 2/1974 | Janu | ................. | G01L 11/006 137/82 |
| 4,346,633 | A | * | 8/1982 | Rendl | ................. | B25B 23/141 464/43 |
| 4,664,635 | A | * | 5/1987 | Hermann | ................. | G09B 9/00 434/365 |
| 5,138,885 | A | * | 8/1992 | Okauchi | ................. | G01L 19/14 73/708 |
| 6,615,665 | B1 | * | 9/2003 | Flogel | ................. | G01L 9/0073 361/283.1 |
| 6,810,746 | B2 | * | 11/2004 | Naegele | ................. | G01L 9/0051 73/715 |
| 6,997,059 | B2 | * | 2/2006 | Ernsberger | ................. | G01L 9/0052 361/283.1 |
| 7,152,477 | B2 | * | 12/2006 | Banholzer | ................. | G01L 9/0075 73/700 |
| 7,574,921 | B2 | * | 8/2009 | Fessele | ................. | G01L 19/0007 73/756 |
| 7,992,445 | B2 | * | 8/2011 | Kobayashi | ................. | G01L 9/0075 73/718 |
| 8,020,449 | B2 | * | 9/2011 | Weiss | ................. | G01L 19/0084 73/715 |

(Continued)

*Primary Examiner* — Lisa Caputo
*Assistant Examiner* — Jamel Williams
(74) *Attorney, Agent, or Firm* — Muncy, Geissler, Olds & Lowe, P.C.

(57) ABSTRACT

A measuring instrument includes at least a measuring element and a sealing fitting having a two-part design that provides structural improvements with regard to permanent tightness and in service conditions under vibration and temperature.

19 Claims, 5 Drawing Sheets

(56) References Cited

U.S. PATENT DOCUMENTS

2010/0170794 A1* 7/2010 Gibson .............. G01N 27/4062
204/406

* cited by examiner

MEASURING INSTRUMENT WITH CONNECTING COUPLING

This nonprovisional application claims priority under 35 U.S.C. §119(a) to German Patent Application No. 10 2015 004 934.8, which was filed in Germany on Apr. 17, 2015, and which is herein incorporated by reference.

FIELD OF THE INVENTION

The invention relates to a measuring instrument for measuring pressure or temperature of a fluid for continuous service.

DESCRIPTION OF THE BACKGROUND ART

In particular, the invention is applicable to a pressure measuring instrument which includes a measuring element made of a metal sheet or a tube. The ability to mount the measuring instrument on hydraulic or pneumatic components in a seal-forming manner is improved with regard to permanent tightness and taking into account conditions of use at the sealing fitting. The measuring instrument is preferably improved by means of structural improvements, additionally with regard to the orientation during mounting on an application component, a replacement of the measuring instrument and the like.

If a manometer is installed as the measuring instrument on an application component in which vibrations occur for structural reasons, which is the case, for example, in compressors or plastic injection-molding machines, the components engaging with the measuring instrument are subject to increased wear, due to the movements relative to each other. However, this also applies to temperature fluctuations that occur when components variably expand relative to each other upon the application of pressure, whereby leaks may occur. Expansions in opposite directions may result in an undesirable gap in this regard.

This problem arises, for example, when a manometer as the measuring instrument, which includes a pressure fitting in the form of a plastic thread, is screwed into an aluminum component, for example, of a pneumatic application. Conventional thread seal tape is unable to adequately solve this problem, and leaks therefore regularly occur in applications of this type. In pneumatic applications, compressed air escaping at multiple points, however, represents a weak point, which must be compensated for with increased compressor power at the infeed point. However, this compensation is associated with significant operating costs, in particular in large production facilities.

SUMMARY OF THE INVENTION

The object of the present invention is to provide a cost-effective approach to improving the tightness and mountability of measuring instruments for measuring pressure or temperature of a fluid in special applications. The improvement relates, in particular, to the mounting of the sealing fitting on the application component, while also taking into account changing temperature influences.

This object is achieved by a measuring instrument for measuring pressure or temperature of a fluid for continuous service having the features of claim 1. Advantageous refinements of the invention are specified in the dependent claims.

The invention follows the approach of a structural design, in which a maximum and permanent tightness is achieved cost-effectively even under extreme conditions. In particular, the influences of temperature and vibrations are taken into account.

The stability of the pressure fitting is improved in such a way that a leak is largely prevented both during mounting and during continuous service. The measuring instrument should also be leak-proof even in the event of pressure changes in the ambient pressure. In particular, a desired orientation relative to an observer should be easily possible when changing or replacing the measuring instrument.

According to an exemplary embodiment of the invention, the measuring instrument can include at least the following for measuring pressure or temperature of a fluid for continuous service: a housing, a measuring element disposed within the housing, and/or a pressure fitting disposed on the outside of the housing. The measuring element can be connected to the pressure fitting to form a seal. The pressure fitting can have a thread section designed as an outer thread, and the pressure fitting can have a two-part design.

The measuring instrument according to an embodiment of the invention can be provided for mounting in a seal opening of an application component. The fluid is in fluid connection with the measuring element for the purpose of carrying out the desired measurement. The type of measurement and the shape of the measuring element are not essential to the present invention. The application component may be, for example, a hydraulic component or a pneumatic component.

The two-part design of the pressure fitting provides extensive advantages, as illustrated below in connection with additional specific embodiments.

According to an embodiment, the pressure fitting includes a housing-side section and coupling part which may be detachably mounted on the housing-side section in an axial orientation. According to this specific embodiment, the coupling part is designed as a removable element of the pressure fitting, the coupling part forming one of the two parts of the pressure fitting, which serves, in particular, as an axial extension of the housing-side section.

According to an embodiment, the thread section of the pressure fitting is formed by a first thread section, which is provided on an outer circumference of the housing-side section, and a second thread section, which is provided on an outer circumference of the coupling part.

The first thread section and the second thread section together form the thread section of the pressure fitting, which is designed as an outer thread and may be used for mounting. With the aid of this outer thread, the measuring instrument is screwed into a seal opening of an application component. The specifications of the outer thread are adapted to those of the inner thread of the seal opening.

According to an embodiment, the coupling part may be axially brought into contact with the housing-side section. In this state, the first thread section and the second thread section abut each other axially.

Due to the fact that the first thread section and the second thread section abut each other axially, an essentially continuous outer thread is formed, which may be screwed into a seal opening of an application component.

According to an embodiment, the pressure fitting may be screwed in a seal-forming manner into an inner thread section of a seal opening of an application component with the aid of the first thread section and the second thread section.

According to an embodiment, the coupling part includes an axially extending neck, which is insertable in a centered manner into a central opening of the housing-side section.

The neck extends into the central opening of the housing-side section in such a way that the outer circumference of the neck comes into contact with the inner circumference of the central opening. Due to the preferably circular shape of the neck and central opening, the neck is thus centered together with the coupling part with regard to the housing-side section. Due to this centered design, an orientation of the first thread section and the second thread section is securely established.

According to an embodiment, the neck has a channel, which forms a fluid connection between the axial end of the neck and an end section of the coupling part opposite the neck.

With the aid of the channel provided in the neck, a fluid connection is established between the end of the pressure fitting and the measuring element for the purpose of being able to carry out the desired measurement.

According to an embodiment, a sealing element is provided between an outer circumference of the neck and an inner circumference of the central opening. An axial and rotational relative movement is thus permitted between the neck and the central opening.

With the aid of this arrangement, an advantageous relative movement between the coupling part and the housing-side section may be permitted in the axial direction and in the rotation direction for the purpose of mounting, while the required tightness is ensured.

According to an embodiment, a seal arrangement is provided in one end region of the coupling part, which is situated axially opposite the neck, for the purpose of forming a seal between the coupling part and a seal opening of an application component.

The seal arrangement can be used to form a seal between the end section of the pressure fitting and the seal opening of the application component for the purpose of providing a tightly sealed fluid connection between the application component and the measuring element, in particular via the channel.

According to an embodiment, the seal arrangement has an axial indentation in the end region of the coupling part as well as a sealing element which is insertable therein and which may be compressed against a sealing surface in the seal opening of the application component.

With this design, the sealing element may be compressed between an axial surface in the end region of the coupling part and a sealing surface in the seal opening of the application component to thereby establish the seal between the pressure fitting and the application component. The sealing element is preferably a sealing ring made of an elastic material. The sealing element used may be designed in the shape of an O ring or an extruded sealing ring made of elastomer. The sealing element is shaped by corresponding dimensioning in such a way that it forms a seal by being pressed in a defined manner in the direction of the pressure fitting, even in the event of great temperature fluctuations and expansions of the components toward or against each other.

According to an embodiment, the axial indentation is radially limited, at least in sections, by a stop element, which may be brought into contact against the sealing surface in the seal opening of the application component for the purpose of limiting the compression of the sealing element.

With the aid of this arrangement, the compression of the sealing element may be limited when the pressure fitting is screwed into the seal opening of the application component, since the screw-in depth is limited by the contact between the stop element and the sealing surface in the seal opening of the application component. The matching of the indentation to the dimensions of the sealing ring used may be carried out in such a way that a predetermined compression of the sealing element is established when the stop element comes to rest on the sealing surface.

According to an embodiment, at least one of the sealing elements is, in particular, captively molded or extruded onto the coupling part.

The sealing element which is provided on the neck of the coupling part may be molded into a circumferential groove and be made of an elastic material, so that a seal is established by the sealing element on the inner circumference of the central opening. The sealing element which is provided in the axial end region of the coupling part is furthermore molded into the axial indentation. Alternatively, a section of the thread which is provided on the outer circumference of the coupling part may be made of an elastic and sealing material, so that, when screwed in, a seal may be established in the region of the windings.

According to an embodiment, a tool engagement device is provided on the axial free end of the neck, with the aid of which a torque may be applied to the coupling part.

With the aid of this arrangement, it is possible to remove the coupling part from the seal opening of the application component by applying a torque to the coupling part with the aid of a suitable tool for the purpose of unscrewing the coupling part from the inner thread of the seal opening of the application component. The shape of the tool engagement device may be designed as a hexagon socket on the end section of the neck. Alternatively, tool engagement surfaces or a hexagon head or the like may be provided on the neck of the coupling part, which may be gripped by a suitable, in particular, standardized tool.

According to an embodiment, a tool engagement device is provided on the housing-side section of the pressure fitting for the purpose of applying a torque to the housing-side section of the pressure fitting.

The tool engagement device on the housing-side section of the pressure fitting may be provided between the outer thread of the housing-side section and the housing. The tool engagement device may be formed, for example, by engagement surfaces in a region between the thread section of the housing-side section and the housing, for example by four surfaces situated at right angles to each other. Alternatively, a hexagon head may be provided. A tool engagement device of this type may be easily used to apply a torque to the housing-side section with the aid of a open-end wrench or the like.

According to an embodiment, the measuring instrument furthermore includes a torque transmitting device for transmitting a torque from the housing-side section of the pressure fitting to the coupling part. The transmission of the torque should be preferably facilitated in the presence of a predetermined relative position between the housing-side section of the pressure fitting and the coupling part.

The coupling part may be moved, in principle, relative to the housing-side section of the pressure fitting in the axial direction and in the rotation direction. The relative mobility between the housing-side section and the coupling part in the rotation direction should be limited by the torque transmitting device in such a way that a torque may be applied to the coupling part in a predetermined relative position by turning the housing-side section of the pressure fitting. In particular, this serves the purpose of screwing the coupling part into the seal opening of the application component together with the housing-side section and with the aid of a rotational movement thereof.

According to an embodiment, the torque transmitting device includes a housing-side engaging element and a coupling part-side engaging element, which come into engagement when the coupling part is inserted into the housing-side section while the pressure fitting is being screwed in. This engagement forces a joint rotation of the housing-side section and the coupling part, in particular while the fitting is being screwed in.

The engagement takes place, in particular, when the coupling part comes to rest against the housing-side section, when a predetermined relative alignment is achieved between these elements in the rotation direction. This relative alignment in the rotation directly occurs when the outer thread sections of the coupling part and the housing-side section are aligned with regard to their thread turns, so that one essentially continuous thread turn results. In this case, the pressure fitting may be screwed into a virtually uniform outer thread in the seal opening of the application component by applying a torque to the housing-side section.

According to an embodiment, the housing-side section is rotatable relative to the coupling part in the state in which the pressure fitting is screwed into the seal opening of the application component. In this state, in particular, the housing-side section is rotatable relative to the coupling part against the screw-in direction.

After the pressure fitting has been screwed all the way into the seal opening of the application component, the housing-side section may be counter-rotated against the screw-in direction, so that the engagement between the housing-side engaging element and the coupling part-side engaging element is released. The coupling part may thus remain in the seal opening of the application component, while the housing-side section, and thus the measuring instrument mounted thereon, may be oriented in the rotation direction. By counter-rotating the housing-side section, the latter is moved away from the coupling fitting axially relative thereto. In particular, if the housing-side section is rotated 360 degrees relative to the coupling part, a distance between these elements is eliminated according to an incline of the thread provided on the housing-side section.

According to an embodiment, the axial overlapping of the engaging elements in the engagement state is no greater than the incline of the thread section. In particular, the engaging elements have an axial dimension that is no greater than the incline of the thread section.

This arrangement makes it possible to rotate the housing-side section all the way out of the seal opening of the application component, while the coupling part remains in the seal opening. This is facilitated by the fact that the engaging elements extending axially or projecting in the axial direction pass each other without engaging after one complete revolution of the housing-side section.

The engaging elements do not have to be designed as elements projecting in the axial direction. It is also possible to provide indentations in the housing-side section and/or in the coupling part, with the aid of which a mutual engagement may be established, in particular in the circumferential direction.

With the present invention, therefore, a measuring instrument is proposed, which may be screwed into a seal opening of an application component during mounting, so that a seal-forming fluid connection is established between the seal opening of the application component and the measuring element. In contrast to previous measuring instruments, the rotation position may be readjusted during mounting with regard to the axial direction of the thread by counter-rotating the measuring instrument for the purpose of thereby adapting the visibility or readability of the measuring instrument to the present application. With the present invention, however, the counter-rotation does not move the coupling part out of the completely screwed-on position, so that the seal may be permanently ensures even after adjusting the position of the measuring instrument.

The measuring instrument may have a pointer scale which indicates, for example, the pressure to be measured by the measuring element. However, the measuring instrument may include another mechanical or electronic sensor system, which emits measuring signals wirelessly or via a cable. The pressure fitting may face backward on the back of the housing of the measuring instrument, or it may extend, for example downwardly, on the outer circumference of the housing. Any other radial direction from the housing may be provided. Depending on the design, additional embodiments of the measuring instrument are conceivable, for example an angular housing or a cylindrical housing, having a concentric pressure fitting facing downward or having a pressure fitting designed as a shoulder.

Alternatively, the pressure fitting, in which the front coupling part is also screwed into the seal opening of an application component during assembly, may be permanently mounted in this location by pressing and/or thread locking, the sealing element then coming into permanent contact on the seal opening of the application component.

The measuring instrument may furthermore be unmounted, the coupling part then being able to remain in the seal opening. A replacement of the measuring instrument may thus be carried out without having to remove the coupling element.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Exemplary embodiments of a measuring instrument 1 according to the present invention are described below on the basis of the drawings. It is hereby noted that the drawings serve the sole purpose of explaining the inventions, and the invention is not limited to the details shown in the figures.

Figure 1:
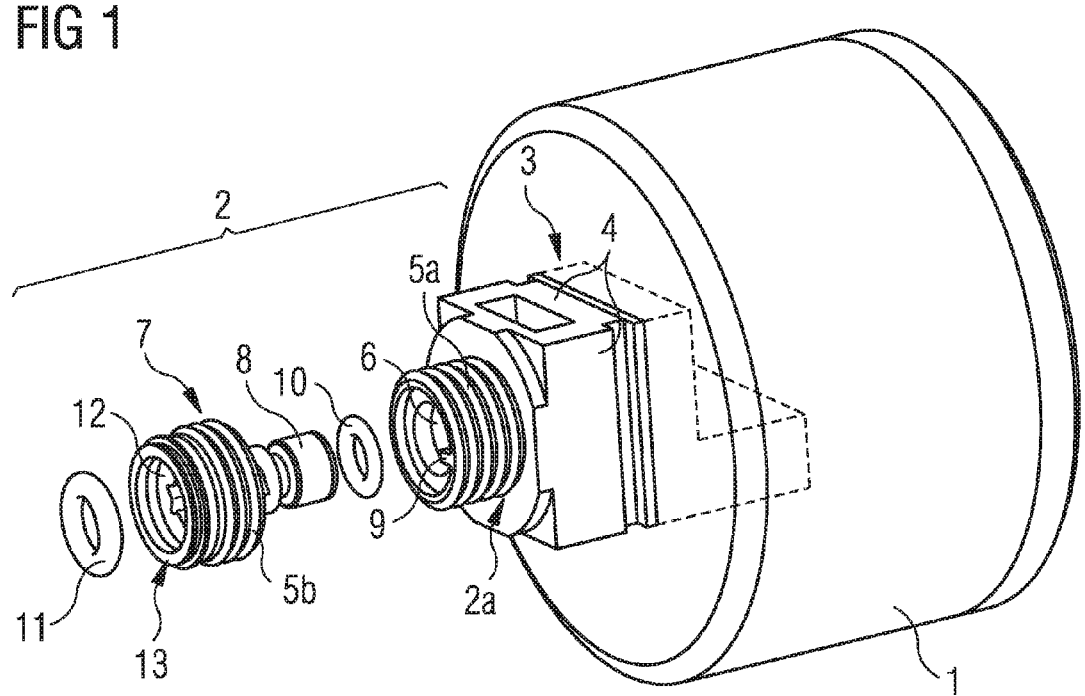
FIG. 1 shows a specific embodiment of the measuring instrument 1 of the present invention in an exploded view.

The measuring instrument 1 shown in FIG. 1 includes a pressure fitting 2, which in the illustrated exemplary embodiment is mounted on the back of a housing 3 of measuring instrument 1 relative to a scale which is not shown.

The measuring instrument may be designed as a pressure measuring instrument but is not limited thereto. In this case, a measuring element in the form of a Bourdon tube or a Bourdon spring or a membrane is provided in the housing. A scale to which a pressure range is applied, a motion work which converts a deflection of the measuring element into a pointer motion as the pressure rises and displays it on the scale, and a window which seals the housing tightly in the direction of the viewer are furthermore provided.

In the present exemplary embodiment, pressure fitting 2 has two parts, namely a housing-side part 2a and a coupling part 7. Housing-side section 2a includes a first thread section 5a. In the present exemplary embodiment, a block-shaped element is provided between first thread section 5a and the housing, on which surfaces 4 are formed, which act as a tool engagement device, for example in the form of flats. On these surfaces 4, a torque may be applied to housing-side section 2a, for example with the aid of an open-end wrench.

Housing-side section 2a furthermore has a central opening 6, which extends within first thread section 5a and through the entire length of housing-side section 2a.

Coupling part 7 includes a second thread section 5b, which is adapted to first thread section 5a with respect to dimensioning, namely with respect to the diameter, the incline and the thread shape. In addition, coupling part 7 includes a neck 8, which extends axially from the region of coupling part 7, on which second thread section 5b is provided.

In the present exemplary embodiment, a circumferential groove, into which a sealing element 10 may be inserted, is provided on neck 8. An indentation 12, into which a sealing element 11 may be inserted, is provided on the end of coupling part 7 which is opposite neck 8. Indentation 12 is surrounded by a stop element 13 designed as a depth stop. The axial depth of indentation 12, which is surrounded by stop element 13 in the present exemplary embodiment, is preferably less than the thickness of sealing element 11 in the relaxed state. In the present exemplary embodiment, which is shown in FIG. 2, sealing element 11 is pressed into indentation 12 up to measure V.

In particular, when screwing the pressure fitting into an aluminum pneumatic part with connection standard G ⅛ or G ¼ thread, the longitudinal expansions between plastics (e.g., PA, PE, PBT) are a multiple of each other, so that the degree of axially elastic compression as well as the dimensioning and material selection represent key components. An O ring made of EPDM, NBR, FKM, nitrile or butadiene rubber in a cord thickness of 1 to 6 mm, preferably 1.8 to 3.5 mm, in a Shore hardness of 50 to 90 Shore, preferably 60 to 70 Shore D, has been proven to be particularly advantageous.

Figure 2:
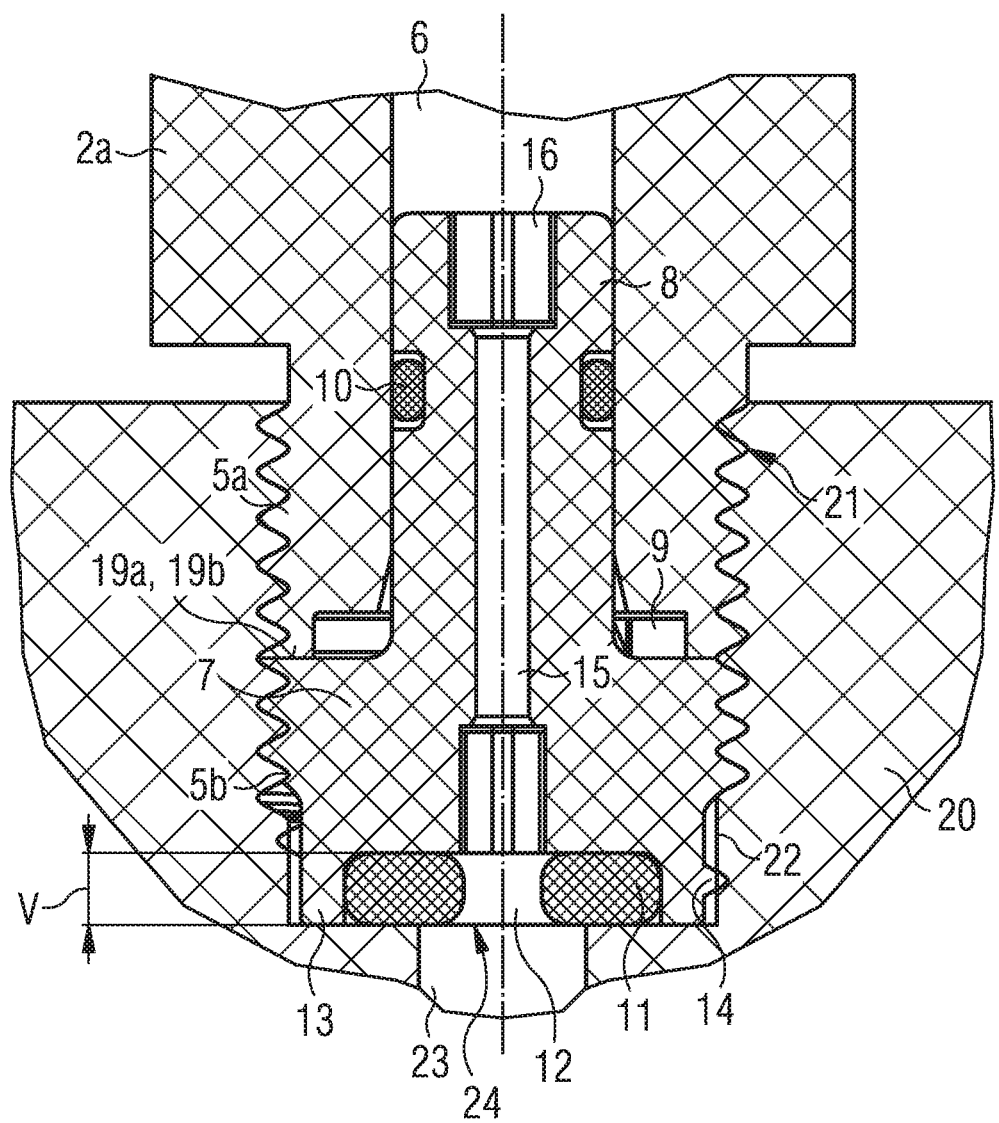
FIG. 2 show a cross-sectional view of a section of the measuring instrument of the present invention in the mounted state.

FIG. 2 shows pressure fitting 2 of measuring instrument 1 in the installed state. Pressure fitting 2 is built into an application component 20, which has a seal opening 21 equipped with an inner thread. In the illustration in FIG. 2, stop element 13 is in contact with a base 24 of seal opening 21. Sealing element 11 is compressed in the indentation and thus establishes a seal between a channel opening 23 of application component 20 and coupling part 7.

Coupling part 7 has a channel 15, which establishes a connection between indentation 12, and thus between channel opening 23 of application component 20, and the end of neck 8. In the mounted state, neck 8 extends into a central opening 6 in housing-side section 2a.

In the illustrated situation, sealing element 10 is inserted into the annular recess, designed as a groove, which is provided on the outer circumference of neck 8. Sealing element 10 is in contact with an inner circumferential surface of central opening 6 and thus forms a seal between the outer circumferential surface of neck 8 and the inner circumferential surface of central opening 6. The radial depth of the annular recess is preferably less than the thickness of sealing element 10 in the relaxed state.

In the view in FIG. 2, housing-side section 2a is screwed into seal opening 21 axially in contact with coupling part 7. In this situation, in particular, a contact surface 19a of housing-side section 2a is in contact with a contact surface 19b of coupling part 7.

Central opening 6 is connected to a measuring element, which is not illustrated in greater detail and which is situated within housing 3 of measuring instrument 1. In the state shown in FIG. 2, a sealed fluid connection exist between channel opening 23 of application component 20 and central opening 6 via channel 15 in the direction of the measuring element.

The mounting of measuring instrument 1, together with pressure fitting 2, on seal opening 21 of application component 20 is explained below.

Measuring instrument 1 is screwed into seal opening 21 with the aid of inserted coupling part 7. As preparation, neck 8 is inserted into central opening 6 of housing-side section 2a until contact surfaces 19a and 19b come to rest against each other. A torque is subsequently applied to housing-side section 2a with the aid of tool engagement device 4.

In the region of contact surfaces 19a and 19b, a torque transmitting device is provided in the measuring instrument according to the invention, which includes a housing-side engaging element 9 and a coupling-side engaging element 17. These elements are explained in greater detail below with reference to FIG. 4.

Figure 4:
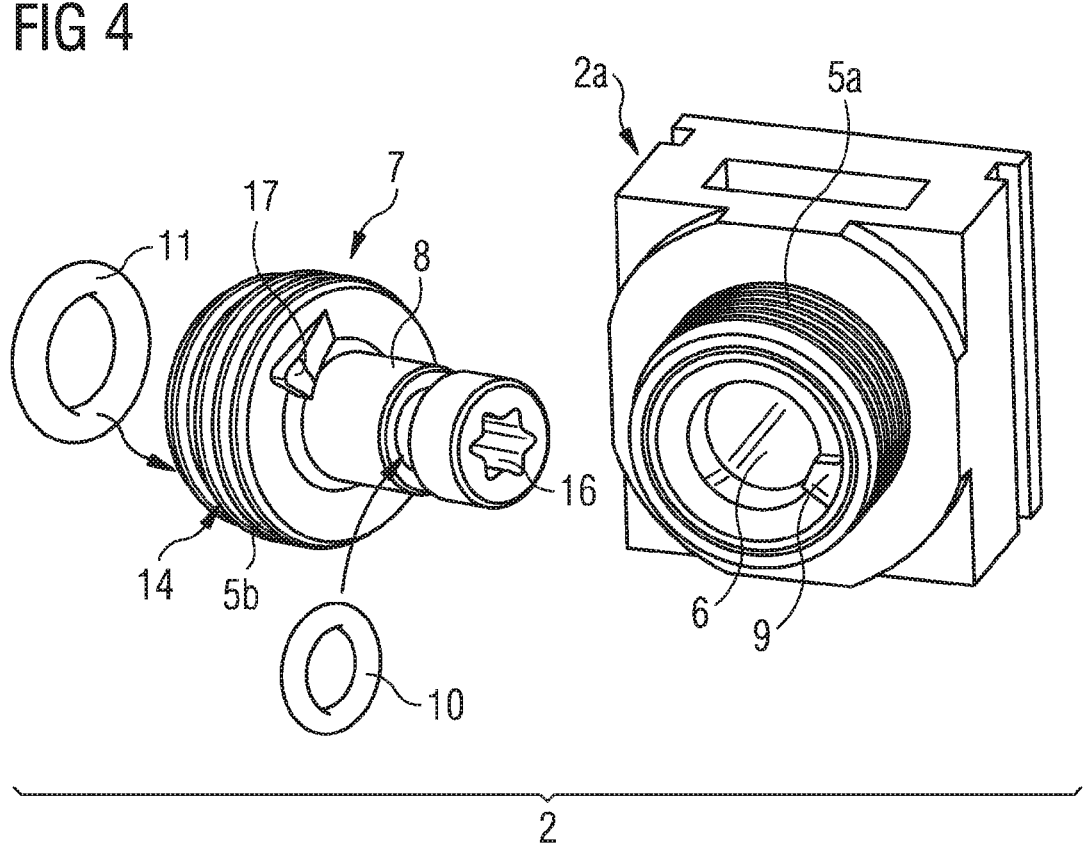
FIG. 4 shows a detailed view of elements of measuring instrument 1 of the present invention.

FIG. 4 shows coupling part 7 in an individual view. In the region of contact surface 19b of coupling part 7, a coupling part-side engaging element 17 is provided in the form of a projection which extends eccentrically from contact surface 19b. A housing-side engaging element 9 is provided in contact surface 19a of housing-side section 2a in the form of a projection, which is also eccentrically disposed and may engage with coupling part-side element 17 in a predetermined relative position of coupling part 7 and housing-side section 2a.

With reference to FIG. 2, housing-side engaging element 9 may thus come into contact with coupling part-side engaging element 17 due to the rotation of housing-side section 2a, so that a rotation of housing-side section 2a is transferred to coupling part 7. Due to the rotation of housing-side section 2a, for example with the aid of tool engagement device 4, entire pressure fitting 2 may thus be screwed into seal opening 21 as a single unit.

In the state illustrated in FIG. 2, stop element 13 is in contact with base 24 of seal opening 21 of application component 20. Coupling part 7 may thus be held in place by the self-locking action of second thread section 5b on the inner thread in seal opening 21.

Figure 3:
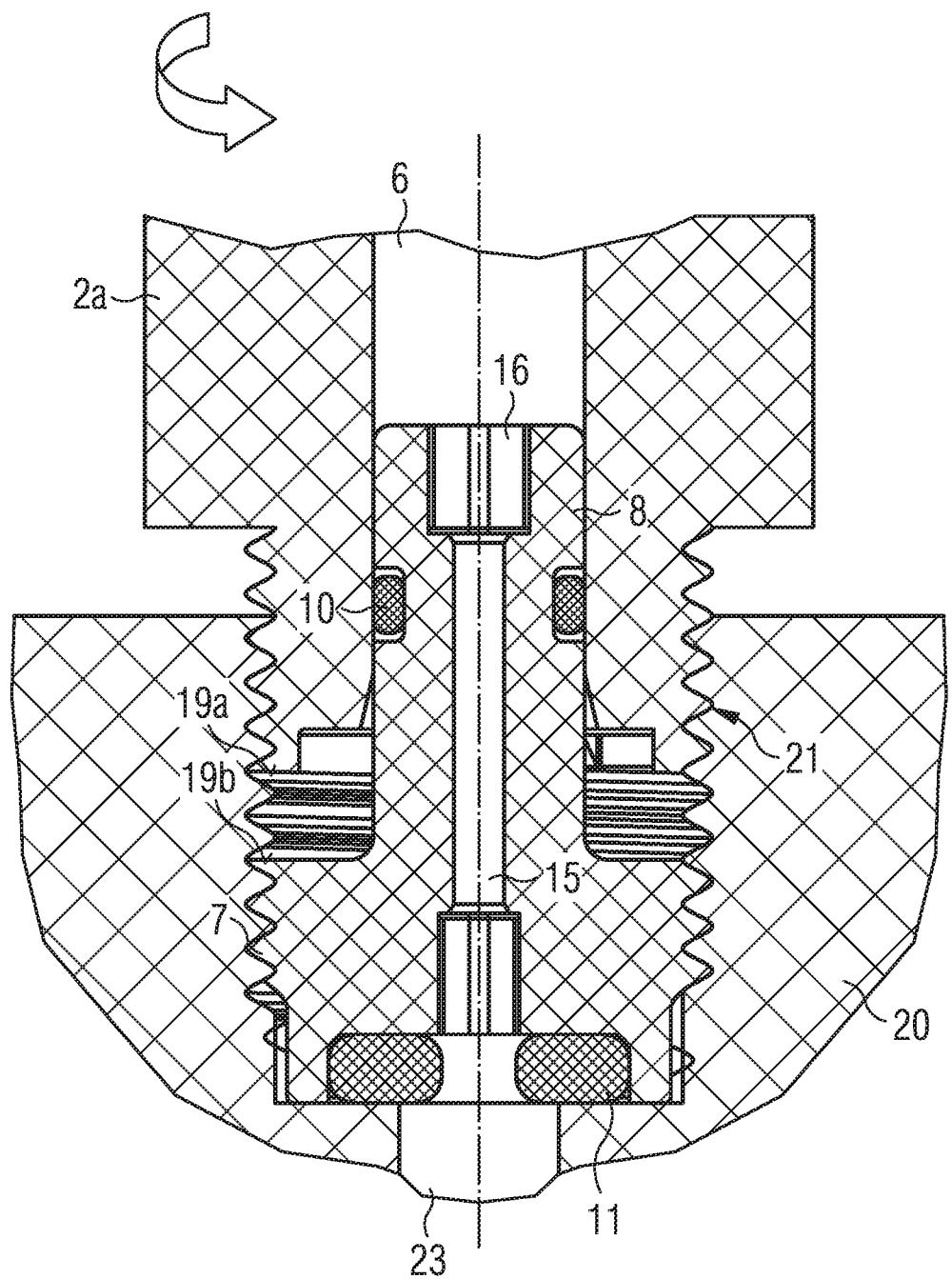
FIG. 3 show a cross-sectional view of a section of measuring instrument 1 of the present invention in the mounted state, in which the pressure fitting is counter-rotated.

Measuring instrument 1 is illustrated in FIG. 3, including a counter-rotated housing-side section 2a. As indicated by the illustrated arrow, housing-side section 2a may be counter-rotated against the screw-in direction, coupling part 7 remaining in the fully screwed-in state. The position of coupling part 7 remains unchanged, due to the aforementioned self-locking action between second thread section 5b and the inner thread of seal opening 21.

In this process, housing-side section 2a is rotated relative to coupling part 7, on the one hand, and is axially moved away from coupling part 7 on the other hand, due to the influence of the thread engagement. This combined rotational and translational movement is guided by the inner circumferential surface of central opening 6 and the outer circumferential surface of neck 8. Sealing element 10 accommodated in the groove remains in constant contact with the inner circumferential wall of central opening 6, due to the compressed installation situation and under the necessary contact pressure.

Due to the combined rotational and translational movement of housing-side element 2a, housing-side engaging element 9 may travel past coupling part-side engaging element 17 after approximately one revolution, starting from the engagement state of the engaging elements. In particular, this is made possible by the fact that the height of each of the engaging elements, which are designed as projections in this exemplary embodiment, is less than the incline of the thread used. This ensures that, after one revolution, the translational movement is sufficient to prevent a blocking of the engaging elements on the corresponding back sides. At the same time, this prevents coupling part 7 from unintentionally rotating out.

According to the invention, measuring instrument 1 may thus be screwed into seal opening 21 of application component 20, as is known in customary one-piece pressure fittings. In particular, only coupling part 7 has to be inserted into central opening 6 of housing-side section 2a, and pressure fitting 2 may then be screwed in all the way by applying a torque to tool engagement device 4 of housing-side section 2a.

Unlike in known one-piece pressure fittings, however, measuring instrument 1 may be counter-rotated together with housing-side section 2a mounted thereon, so that the rotation position is ensured in the circumstances, in particular with regard to the readability of the display. In particular, unlike in known pressure fittings, the tightness is ensured, since coupling part 7 remains fixedly screwed into seal opening 21, and another seal is furthermore provided between neck 8 of coupling part 7 and housing-side section 2a.

Figure 5:
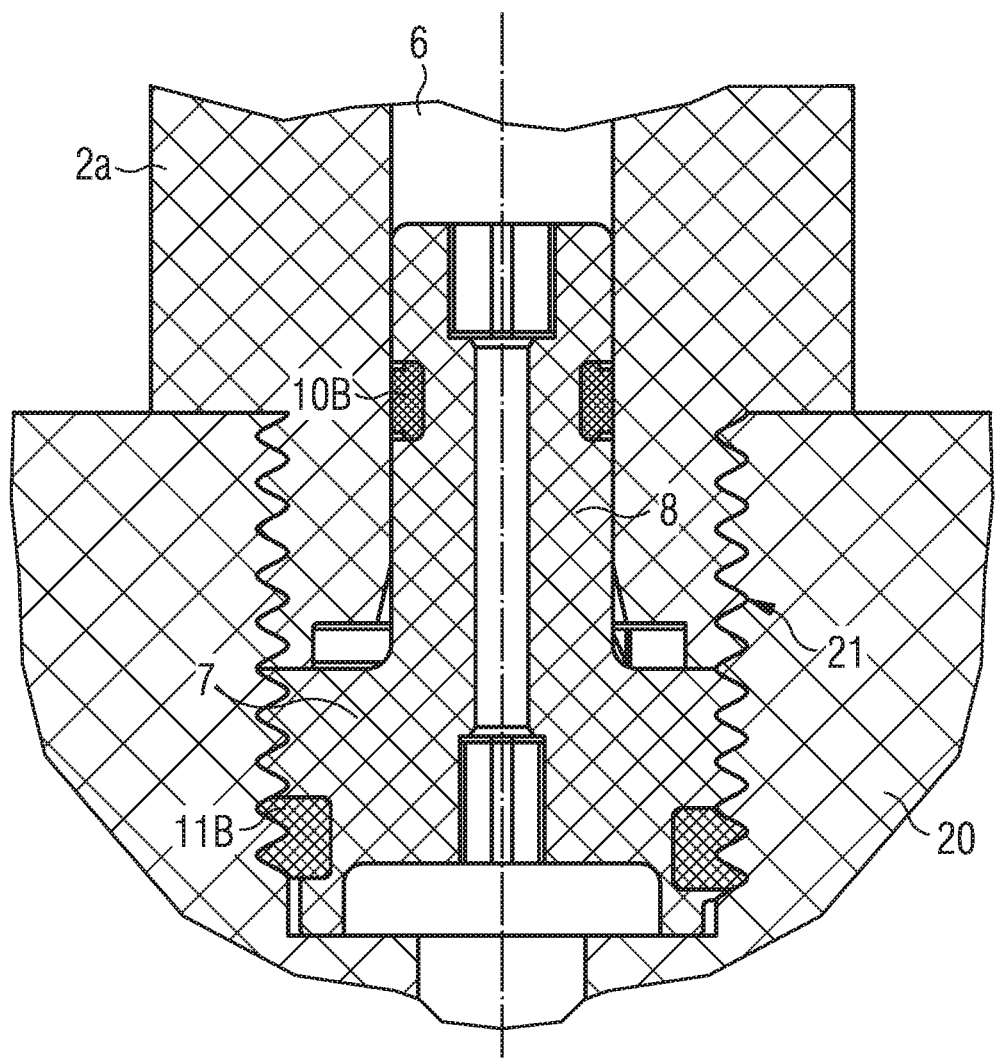
FIG. 5 show a cross-sectional view of a section of the measuring instrument in a modified specific embodiment.

An alternative embodiment of the measuring instrument according to the invention is shown in FIG. 5.

The changes over the preceding explanations apply to sealing elements 10B and 11B, as is apparent in FIG. 5. In particular, sealing element 10B is provided as a molded-on or extruded-on sealing element, which is, in particular, captively mounted on neck 8 of coupling part 7. This molded-on sealing element 10B is molded in a circumferential groove and is made from an elastic material which ensures a seal relative to the inner circumferential surface of central opening 6, while a rotational and translational movement between coupling part 7 and housing-side section 2a is simultaneously ensured.

In this alternative, sealing element 11B, which is intended to act as a seal between coupling part 7 and seal opening 21 of application component 20, is also designed as a molded-on or extruded-on sealing element 11B. In the present exemplary embodiment, as shown in FIG. 5, molded-on sealing element 11B is formed on second thread section 5b of coupling part 7. Molded-on sealing element 11B in this specific embodiment is molded into a radial recess and is pressed against the inner thread of seal opening 21 when coupling part 7 is screwed in. This similarly establishes a seal between coupling part 7 and seal opening 21.

It is furthermore conceivable that sealing element 11B is a coated, elastic flat sealing ring, which has a rectangular cross section and plastically fits to the thread in a seal-forming manner when the coupling part is screwed in and thus, in particular, also compensates for diameter tolerances of the threaded fitting and forms a seal. Due to the machining of the threaded fittings, large fluctuations in diameter are indeed a matter of course, e.g., even when executed in aluminum; in particular, a soft or plastic material in the form of a flat seal or extruded or, in particular made of a thermoplastic elastomer (TPE) or a particularly soft silicone may be advantageous here. Possible radial sealing edges are also not illustrated, which are compressed by the mounting action and result in a sealing contact within the bore 6. Sealing ring 11B may furthermore be designed as a molded-on, elastic seal on coupling part 7. It is also conceivable that this sealing ring is extruded onto coupling element 7 with the aid of plastics engineering techniques, and this element handles not only the sealing action but also the permanent fixing of the coupling part in seal opening 21 of application component 20 by means of a self-locking action.

In one alternative specific embodiment, coupling element 7 may have a plastically deformable end section 14. As shown in FIG. 2, plastically deformable end section 14 of coupling part 7 deforms, which is induced by the compressive force which is applied against base 24 of seal opening 21 while coupling part 7 is being screwed in. This regard, a constriction 22 is provided on the end section of seal opening 21, so that the plastic deformation of plastically deformable end section 14 causes a permanent fixing of coupling part 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring instrument for measuring pressure or temperature of a fluid for continuous service, the measuring instrument comprising:
a housing;
a measuring element disposed within the housing; and
a pressure fitting disposed on an outside of the housing,
wherein the measuring element is connected to the pressure fitting to form a seal;
wherein the pressure fitting has a thread section configured as an external thread,
wherein the pressure fitting has a two-part design,
wherein the pressure fitting comprises a housing-side section and a coupling part that is adapted to be detachably mounted on the housing-side section in an axial orientation,
wherein the thread section of the pressure fitting is formed by a first thread section, which is provided on an outer circumference of the housing-side section, and a second thread section, which is provided on an outer circumference of the coupling part, and
wherein the first thread section and the second thread section align in a serial manner along an axial length of the pressure fitting, such that the first thread section and the second thread section form a continuous external thread of the pressure fitting.

2. The measuring instrument according to claim 1, wherein the coupling part is axially attachable to the housing-side section, and wherein the first thread section and the second thread section axially abut each other.

3. The measuring instrument according to claim 1, wherein the pressure fitting is adapted to be screwed to form a seal into an inner thread section of a seal opening of an application component via the first thread section and the second thread section.

4. The measuring instrument according to claim 1, wherein the coupling part includes an axially extending neck, which is insertable in a centered manner into a central opening of the housing-side section.

5. The measuring instrument according to claim 4, wherein the neck has a channel, which forms a fluid connection between an axial end section of the neck and an end region of the coupling part opposite the neck.

6. The measuring instrument according to claim 4, wherein a first sealing element is provided between an outer circumference of the neck and the inner circumference of the central opening, the first sealing element permitting an axial and rotational relative movement between the neck and the central opening.

7. The measuring instrument according to claim 4, wherein a seal arrangement is provided in an end region of the coupling part, which is situated axially opposite the neck, for forming a seal between the coupling part and a seal opening of an application component.

8. The measuring instrument according to claim 7, wherein the seal arrangement has an axial indentation in the end region of the coupling part as well as a second sealing element, which is insertable therein and which may be compressed against a sealing surface in the seal opening of the application component.

9. The measuring instrument according to claim 8, wherein the axial indentation is limited, at least in sections, by a stop element, which may be brought into contact against the sealing surface of the seal opening in the application component for the purpose of limiting the compression of the second sealing element.

10. The measuring instrument according to claim 6, wherein the first sealing element is captively molded onto the coupling part.

11. The measuring instrument according to claim 4, wherein a tool engagement device is provided on an axial free end of the neck, with the aid of which a torque is applied to the coupling part.

12. The measuring instrument according to claim 1, wherein a tool engagement device is provided on the housing-side section of the pressure fitting for applying a torque to the housing-side section of the pressure fitting.

13. A measuring instrument for measuring pressure or temperature of a fluid for continuous service, the measuring instrument comprising:
a housing;
a measuring element disposed within the housing; and
a pressure fitting disposed on an outside of the housing,
wherein the measuring element is connected to the pressure fitting to form a seal;
wherein the pressure fitting has a thread section configured as an external thread,
wherein the pressure fitting has a two-part design, and
wherein the pressure fitting comprises a housing-side section and a coupling part that is adapted to be detachably mounted on the housing-side section in an axial orientation,
the measuring instrument further comprising a torque transmitting device for transmitting a torque from the housing-side section of the pressure fitting to the coupling part in the presence of a predetermined relative position between the housing-side section of the pressure fitting and the coupling part.

14. The measuring device according to claim 13, wherein the torque transmitting device includes a housing-side engaging element and a coupling part-side engaging element, which come into engagement when the coupling part is inserted into the housing-side section while the pressure fitting is being screwed in, so that a joint rotation of the housing-side section and the coupling part is forced.

15. A measuring instrument for measuring pressure or temperature of a fluid for continuous service, the measuring instrument comprising:
a housing;
a measuring element disposed within the housing; and
a pressure fitting disposed on an outside of the housing,
wherein the measuring element is connected to the pressure fitting to form a seal;
wherein the pressure fitting has a thread section configured as an external thread,
wherein the pressure fitting has a two-part design,
wherein the pressure fitting comprises a housing-side section and a coupling part that is adapted to be detachably mounted on the housing-side section in an axial orientation, and
wherein the housing-side section is rotatable relative to the coupling part against the screw-in direction, in the state in which the pressure fitting is screwed into a seal opening of an application component.

16. The measuring instrument according claim 14, wherein an axial overlapping of the housing-side engaging element and the coupling part-side engaging element in the engagement state is not greater than the incline of the thread section.

17. The measuring instrument according to claim 8, wherein the second sealing element is captively molded onto the coupling part.

18. The measuring instrument according to claim 1, wherein the entire pressure fitting is disposed on the outside of the housing.

19. The measuring instrument according to claim 3, wherein the inner thread section of the application component is screwed onto threads of both of the first thread section and the second thread section of the pressure fitting.

* * * * *